United States Patent Office
3,136,777
Patented June 9, 1964

3,136,777
2-ETHYL-(HEXYLSULFONAMIDO)-THIOCRESOXY COPPER PHTHALOCYANINES
Hans von Tobel, Riehen, Switzerland, assignor to Sandoz Ltd., Basel, Switzerland
No Drawing. Filed Feb. 4, 1963, Ser. No. 256,154
Claims priority, application Switzerland Feb. 20, 1962
2 Claims. (Cl. 260—314.5)

It has been found that valuable new pthalocyanine derivatives are obtained when phthalocyanines substituted with arylthio groups are sulfochlorinated and subsequently reacted with 2-ethylhexylamine.

The starting phthalocyanines are preferably those which are substituted by 7–9 arylthio groups and which may contain halogen atoms, in particular 1–4 chlorine or bromine atoms, and metal atoms, primarily copper but also zinc, aluminium, iron, cobalt or nickel atoms.

The aryl radicals of the arylthio groups, which may be substituted by any desired but preferably non-water-solubilizing atoms or groups of atoms, e.g. alkyl groups or more particularly methyl groups, are substituted by sulfonic acid chloride radicals by the commonly used method. The reaction mass containing the chlorosulfonic acid can be heated at about 60°–80° C. and an excess of chlorosulfonic acid as large as desired can be used.

The reaction with 2-ethylhexylamine can be carried out in aqueous medium at temperatures between about 0° and 80° C. Sufficient amine is used to allow for one mole to each sulfochloride group.

The preferred phthalocyanine derivatives correspond to the general formula

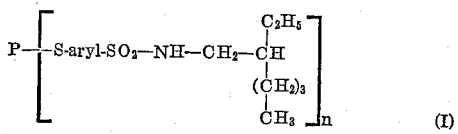

wherein P is the radical of a phthalocyanine molecule which may contain up to 4 chlorine and/or bromine atoms and a metal atom and wherein $n$ is a member between 7 and 9, and the most preferred compounds correspond to the general formula

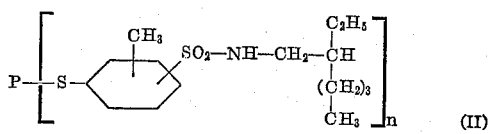

wherein P and $n$ have the meanings given above.

If p-thiocresol is used as a starting material for the production of the phthalocyanines substituted by thiocresoxy groups the phthalocyanine derivatives obtained correspond to the formula

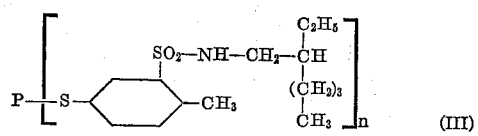

but the isomeric thiocresols and their technical mixtures are also useful.

The products are greenish blue to yellowish green dyes which are soluble in alcohol, acetone, methyl Cellosolve and other organic solvents. They also are dissolved in lacquers of various formulations, e.g. nitrocellulose, cellulose acetate, and vinyl copolymer lacquers, and can be used for their coloration. They are very suitable for dyeing plastics and artificial fibers in the mass or in solution, i.e. for the spin dyeing of cellulose secondary acetate and cellulose triacetate. In these materials they have excellent fastness properties. In the examples the parts are by weight and the temperatures in degrees centigrade.

Example 1

62 parts of octa-p-thiocresoxy copper phthalocyanine are added to 210 parts of chlorosulfonic acid at 35–40°. The temperature is increased to 65° and the mass stirred until a sample is completely dissolved in 1% sodium hydroxide solution on heating. The mass is discharged into a mixture of 1000 parts of ice and 500 parts of water and the precipitated sulfochloride is filtered off. The compressed filter cake is stirred into a mixture of 300 parts of ice and 300 parts of water. 42 parts of 2-ethylhexylamine are added and sodium hydroxide solution is run in slowly until a pH value of 8.5 is obtained. The temperature is increased to 50° within an hour, a constant pH of 8.5 being maintained by gradual addition of sodium hydroxide solution. As soon as no further sodium hydroxide solution is consumed at 50°, the condensation reaction is completed. The dye is filtered off, washed until neutral and dried at 70° with vacuum. 112 parts of a green powder are obtained.

Dyes with very similar properties are obtained when 59 parts of heptathiocresoxy monochlorocopper phthalocyanine or 71 parts of nonathiocresoxy trichlorocopper phthalocyanine are sulfochlorinated in the same way and reacted with 36.5 parts or 46.5 parts respectively of 2-ethylhexylamine.

EXAMPLES OF APPLICATION

Example 2

100 parts of cellulose acetate are mixed with 300 parts of a solvent mixture of 93% acetone and 7% methyl alcohol. The mixture is allowed to swell overnight, then a solution of 0.5 part of the dye obtained according to Example 1 in 70 parts of the solvent mixture of 93% acetone and 7% methyl alcohol is added. The spinning solution is stirred in an open vessel until such time as the cellulose acetate content, through evaporation of a part of the solvent mixture, is again about 25%. Using compressed nitrogen, the spinning solution is then pumped through a filter consisting of one layer of cotton wool and one layer of cotton bearskin into the spinning machine. The filtered spinning solution is maintained at 50° for 1 hour to allow for de-aeration and to reduce its viscosity, and at a nitrogen pressure of 5 atmospheres is then pumped at 50° into the spinning machine. The temperature of the air in the drying shaft is 90°. The spun filaments are dyed in a level, fast-to-light green shade.

Example 3

A mixture of 100 parts of collodion cotton and 250 parts of alkyl resin, plasticized with 25 parts of dioctyl phthalate, is dissolved in 1000 parts of a solvent mixture consisting of 225 parts of ethyl glycol acetate, 190 parts of ethyl alcohol, 75 parts of methyl alcohol, 75 parts of methyl acetate, 15 parts of butyl alcohol and 420 parts of ethyl acetate. To 1000 parts of this nitrocellulose lacquer 5 parts of the dye obtained according to Example 1 are added in portions until the dye is dissolved. The solution is filtered through a nylon filter cloth, applied to aluminium by spraying or another suitable technique, and air dried. A level, fast-to-light green coating is obtained.

Having thus disclosed the invention what I claim is:
1. A compound of the formula

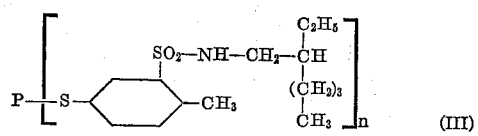

wherein P is copper phthalocyanine substituted by 0 to 4, inclusively, chlorine atoms and $n$ is a number between 7 and 9, inclusively.

2. A compound of the formula
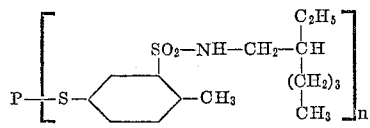
wherein P is copper phthalocyanine substituted by 0 to 4, inclusively, chlorine atoms and $n$ is a number between 7 and 9, inclusively.
References Cited in the file of this patent
UNITED STATES PATENTS
| 2,795,584 | Martin et al. | June 11, 1957 |
| 2,863,875 | Bienert et al. | Dec. 9, 1958 |
| 3,042,683 | Howard et al. | July 3, 1963 |
FOREIGN PATENTS
| 341,591 | Switzerland | Nov. 30, 1959 |